United States Patent
Jaster

(10) Patent No.: US 10,897,170 B2
(45) Date of Patent: Jan. 19, 2021

(54) ELECTRICAL MACHINE HAVING A PRINTED CIRCUIT BOARD ARRANGEMENT FOR WINDING INTERCONNECTION AND ASSOCIATED PRODUCTION METHOD

(71) Applicant: CONTINENTAL AUTOMOTIVE GMBH, Hannover (DE)

(72) Inventor: Magnus Jaster, Kirchmöser (DE)

(73) Assignee: Vitesco Technologies GmbH, Hannover (DE)

(*) Notice: Subject to any disclaimer, the term of this patent is extended or adjusted under 35 U.S.C. 154(b) by 0 days.

(21) Appl. No.: 15/975,333

(22) Filed: May 9, 2018

(65) Prior Publication Data

US 2018/0262072 A1 Sep. 13, 2018

Related U.S. Application Data

(63) Continuation of application No. PCT/EP2016/076944, filed on Nov. 8, 2016.

(30) Foreign Application Priority Data

Nov. 9, 2015 (DE) .................. 10 2015 221 923

(51) Int. Cl.
*H02K 3/12* (2006.01)
*H02K 3/28* (2006.01)
(Continued)

(52) U.S. Cl.
CPC ............. *H02K 3/12* (2013.01); *H02K 3/28* (2013.01); *H02M 7/003* (2013.01); *H02K 11/33* (2016.01); *H02K 2211/03* (2013.01)

(58) Field of Classification Search
CPC . H02K 3/12; H02K 3/28; H02K 11/33; H02K 11/30; H02K 3/50; H02K 2211/03; H02K 3/505; H02K 2203/03; H02M 7/003
(Continued)

(56) References Cited

U.S. PATENT DOCUMENTS 3,165,672 A * 1/1965 Gellert ................. H05K 1/0203
    361/706
6,272,741 B1 * 8/2001 Kennedy ............. H05K 3/3436
    174/260
(Continued)

FOREIGN PATENT DOCUMENTS

DE    102004046544 A1    4/2006
DE    102005032965 A1    3/2007
(Continued)

OTHER PUBLICATIONS

Iles-Klumpner et al. (EP-1638188-A1) English Translation (Year: 2006).*
(Continued)

*Primary Examiner* — Tulsidas C Patel
*Assistant Examiner* — Robert E Mates

(57) ABSTRACT

The disclosure provides an electric machine that includes a stator with an electrical winding having electrically conductive bars arranged in grooves of the stator and each of which has a first cross-sectional area in the region of the grooves. The electric machine includes an inverter circuit for the controlled electrical energization of the winding. The inverter circuit is electrically connected to the winding, and/or the bars are electrically connected to one another, by a circuit board arrangement. The circuit board arrangement has passage bores with a diameter smaller than a maximum dimension of the first cross-sectional area, and one bar end of one of the bars is plugged through each passage bore. The plugged-through bar end has, in the region of the passage
(Continued)

bore, a second cross-sectional area having a maximum dimension smaller than the diameter of the passage bore or equal to the diameter of the passage bore.

5 Claims, 4 Drawing Sheets

(51) Int. Cl.
  *H02M 7/00* (2006.01)
  *H02K 11/33* (2016.01)
(58) Field of Classification Search
  USPC .................................................. 310/201, 179
  See application file for complete search history.

(56) References Cited

U.S. PATENT DOCUMENTS

| | | | | |
|---|---|---|---|---|
| 2006/0066157 | A1* | 3/2006 | Narayanan | H02K 15/0012 310/54 |
| 2010/0039108 | A1* | 2/2010 | Haevescher | G01D 5/145 324/261 |
| 2012/0025746 | A1* | 2/2012 | Kawakubo | H02K 11/33 318/400.25 |
| 2015/0022046 | A1 | 1/2015 | Shibata et al. | |

FOREIGN PATENT DOCUMENTS

| | | | |
|---|---|---|---|
| DE | 102012201499 A1 | 8/2013 | |
| DE | 102013204791 A1 | 9/2013 | |
| DE | 102012205710 A1 | 10/2013 | |
| EP | 1638188 A1 * | 3/2006 | ............... H02K 3/18 |
| EP | 2424079 A1 | 2/2012 | |
| KR | 20140139674 A * | 12/2014 | |
| KR | 20140139674 A | 12/2014 | |

OTHER PUBLICATIONS

Kim (KR 20140139674 A) English Translation (Year: 2014).*
International Search Report and Written Opinion dated Feb. 24, 2017 from corresponding International Patent Application No. PCT/EP2016/076944.
German Office Action dated Oct. 18, 2018 for corresponding German Patent Application No. 10 2015 221 923.2.

* cited by examiner

ELECTRICAL MACHINE HAVING A PRINTED CIRCUIT BOARD ARRANGEMENT FOR WINDING INTERCONNECTION AND ASSOCIATED PRODUCTION METHOD

CROSS-REFERENCE TO RELATED APPLICATIONS

This application claims the benefit of PCT Application PCT/EP2016/076944, filed Nov. 11, 2016, which claims priority to German Application DE 10 2015 221 923.2, filed Nov. 9, 2015. The disclosures of the above applications are incorporated herein by reference.

TECHNICAL FIELD

The disclosure relates to an electric machine having a stator which has an electrical winding formed from electrically conductive bars. The electrical winding is electrically connected to an inverter circuit by at least one circuit board arrangement. The bars of the winding may also be electrically connected in pairwise fashion to one another by the circuit board arrangement. The disclosure also includes a method for producing the electric machine.

BACKGROUND

The winding of a stator of an electric machine is generally manufactured from wires separately from the inverter electronics, that is to say the inverter circuit, and subsequently connected to the inverter circuit. If the winding is formed from electrically conductive bars (bar winding), the connection of the phase terminals of the winding to the printed circuit board of the inverter circuit is realized by plug-in connections, press-fit contacts or sleeves in the printed circuit board. These additional contact elements are welded or soldered to the respective terminal bar. It is therefore achieved that the mechanical forces are accommodated by the separate components, which must however be connected to the bars of the winding for this purpose, which is cumbersome. The introduction of metal eyelets for the electrical connection is also a cumbersome, additional production step associated with additional costs and expenditure of time.

DE 10 2012 201 499 A1 has disclosed a method for connecting an electrical bus rail to a circuit board of a circuit breaker. Here, the bus rail is mechanically and electrically connected to the circuit board by being plugged through a passage opening in the circuit board. Depending on the diameter of the passage opening, a force fit is realized here, which holds the circuit board on the bus rail. The diameter of the opening must however be adapted to the cross section of the bus rail so that the bus rail fits through the opening in the first place.

A particular problem arises here if the bus rail has a cross section with a rectangular shape. The passage opening in the circuit board must then have a corresponding shape, which normally requires a milling process, which requires a separate production step for the circuit board.

SUMMARY

In the case of an electric machine, the disclosure provides a method of interconnecting an inverter circuit with, and mechanically connecting the inverter circuit to, the electrical winding of the stator.

The disclosure provides an electric machine having a stator with an electrical winding and an inverter circuit. The winding has electrically conductive bus rails or bars which are arranged in grooves of the stator and each of which has a first cross-sectional area in the region of the grooves. Each bar may be formed, for example, as a single wire which, at a front axial end and at a rear axial end of the stator, is electrically interconnected with another bar or directly with the inverter circuit. In some examples, two bars are formed by a wire of U-shaped form, such that no additional electrical interconnection of the two bars is necessary at one axial end. The stated axial direction corresponds to the intended axis of rotation of a rotor, arranged in the stator, of the electric machine.

The inverter circuit, i.e., the inverter, is configured for the controlled electrical energization of the winding, as is known per se from the prior art. The inverter circuit is in this case electrically connected to the bars of the winding (directly or indirectly) by at least one circuit board arrangement. In addition or alternatively to this, at least some of the bars are electrically connected to one another in each case in pairwise fashion by the at least one circuit board arrangement. A circuit board arrangement may be a circuit board or printed circuit board (PCB) as is known from the prior art. It may be the circuit board on which electronic components of the inverter circuit are also arranged, or may be a separate or additional circuit board. In the context of the disclosure, a circuit board arrangement is however also to be understood to mean a single electrically conductive plate, for example a copper plate, without an additional electrically insulating carrier substrate. Furthermore, a circuit board arrangement may also be understood to mean a stacked arrangement with multiple electrically conductive plates, which are separated by an electrical insulating medium, for example air or one or more plates or layers having electrically insulating material.

For the connection between the inverter circuit and winding, the at least one circuit board arrangement has passage bores with a diameter smaller than a maximum dimension of the first cross-sectional area of the bars. In each case, one bar end of one of the bars is plugged through each passage bore. Here, the plugged-through bar end has, in the region of the passage bore, a second cross-sectional area which is a maximum dimension smaller than the diameter of the passage bore or equal to the diameter of the passage bore. It is to be noted here that this has the result that the bar end with its second cross-sectional area also has a smaller cross-sectional area than the bar has in the region of the grooves, where the bar has the first cross-sectional area. A ratio of the second cross-sectional area to the first cross-sectional area amounts, for example, to less than 80 percent, such as less than 70 percent. In the case of a rectangular or square cross-sectional area, the maximum dimension is in each case the length of the diagonals; in the case of a circular cross section, it is the diameter. It is furthermore to be noted that, here, "bar end" refers to a fixed constituent part of the bar itself. The bar end and the bar are thus manufactured from one piece. The bar end is not an attachment or an intermediate piece. Instead, the bar is deformed in the region of the bar end, or is reduced in terms of cross-sectional area by a severing process. Here, the described cross-sectional areas describe the size of the section area perpendicular to the direction of longitudinal extent of the respective bar. The printed circuit board has passage bores as passage openings, that is to say a circular shape is involved, such as a circular passage opening or a circular hole.

The disclosure provides that the at least one circuit board arrangement may be manufactured in a standard process, in which the passage bores can be produced independently of the cross-sectional area of the bars. By contrast to the situation in the prior art, it is not the case that the passage bore is adapted to the bars, it rather being the case that the bars are adapted, in the region of their bar ends, to the passage bore by virtue of the bar ends being provided with the second cross-sectional area, which firstly fits through the passage bores and is secondly smaller than the first cross-sectional area in the region of the grooves.

The disclosure provides that bars with a rectangular cross-sectional shape in the region of the grooves can also, without the described milling-out processes, be plugged through circular passage bores in the at least one circuit board arrangement as a result of the conductor ends of the bars being correspondingly reduced or adapted in terms of their cross-sectional area. There is also no need for cumbersome milling-out processes or additional components for connecting the bars to the at least one circuit board arrangement. In some examples, the bars are of straight form proceeding from the grooves as far as the respective passage bore. The at least one circuit board arrangement can thus be plugged onto the bars in an axial direction.

As already stated, the bar ends are in each case a constituent part of one of the bars. To form the cross section of each bar end, the respective bar is narrowed to the second cross-sectional area by a severing process or a deformation process. For example, a bar may have been rolled or stretched in the region of the bar end. As a severing process, the bar end may be produced by punching or milling. This may be an integral manufacturing step during the production of the bars, for example by virtue of a wire being severed and the bar ends also being simultaneously shaped during the severing process, for example by virtue of a punching tool performing both the severing process and the shaping of the bar ends.

In some implementations, the bars have, in the grooves, a rectangular cross section with a long side and a short side. In other words, the bars are wires with a cross section which has a rectangular shape, but which is not square. Bars of this type may be produced from a tetragonal wire. By contrast, the bar ends have, in the region of the passage bore, a square or circular cross section. This yields the advantage that the bar ends can be plugged through a circular passage bore and, in the process, a reliable force fit and/or a reliable electrical connection is realized.

In some implementations, at least one of the bars is of forked design. In other words, the bar has multiple bar ends, each of which is plugged through one of the passage bores. It is thus possible, for example, for multiple bar ends of square cross section to be formed out of a wire with a cross section of rectangular shape. As such, the bar may be connected with an adequately large electrically conductive cross section to the at least one circuit board arrangement.

In the case of the electric machine, it may be provided that, of each phase of the winding (for example 3-phase winding or six-phase winding), per phase, the phase terminals are in each case electrically connected in the described manner to the at least one circuit board arrangement. Then, two bars per phase are connected to the at least one circuit board arrangement. In some examples, the individual coil loops or coils of the winding are electrically interconnected with one another by the at least one circuit board arrangement. In other words, the pairwise interconnection of two bars is realized by the circuit board arrangement. In this example, the electrical winding thus has multiple coils, and some or all of the coils are electrically interconnected with one another by the at least one circuit board arrangement. In this way, it is thus possible for two bars to be connected in series in pairwise fashion. This example provides that, to form a winding, the individual coils do not need to be formed, for example, by pairwise soldering of the bars, it rather being possible for the bars to be plugged with their bar ends through the passage bores of at least one circuit board arrangement and electrically interconnected by the at least one circuit board arrangement. This eliminates a bending process by which, otherwise, the bar ends of the bars respectively to be connected would have to be brought together.

In some implementations, the disclosure includes the possibility of mechanically connecting the bars to the at least one circuit board arrangement.

In some examples, at least some of the bar ends are curved or angled on the opposite side of the passage bore as viewed from the grooves. In other words, the bar ends are plugged through the passage bore and, behind the latter, are kinked or bent. This produces a reliable form fit, which prevents the at least one circuit board arrangement from slipping off the bars.

In some implementations, at least some of the bar ends have a third cross-sectional area, which is larger than the second cross-sectional area, on the opposite side of the passage bore as viewed from the grooves of the stator. In other words, the bar ends are thickened again at their plugged-through side on the opposite side of the passage bore. This may be effected by upsetting or a material build-up of the material of the bar ends. In other words, the bar ends are compressed or riveted. This results in that the form fit thus formed requires no additional space requirement on the at least one circuit board arrangement, as is the case with bending of the conductor ends.

With regard to the electrical connection of the bars to the inverter circuit or of the bars to one another, one example provides that at least some of the bar ends are connected to an electrically conductive outer layer of the at least one circuit board arrangement. The bar ends may for example be welded or soldered to the outer layer. The outer layer may be provided as a copper layer. The example results in that the electrical connection can be defined by conductor tracks on the at least one circuit board arrangement. By contrast, one example provides that at least some of the bar ends are cohesively connected to a bus rail arranged on the at least one circuit board arrangement. The bus rail is soldered onto the at least one circuit board arrangement, for example, based on SMD technology (SMD—Surface Mounted Device). The described cohesive connection may again be provided by welding or soldering. This example results in that the electrically conductive cross section can be defined, independently of the thickness of the outer layer of the at least one circuit board arrangement, through the selection of the bus rail.

The disclosure also includes a method for producing the electric machine. The method provides that a wire with a first cross-sectional area is provided. The wire may for example be delivered or provided on a roll. The wire is severed into wire pieces in order to thereby provide bars for the electrical winding of the stator of the electric machine. Here, a wire piece may constitute a single bar or may be bent to form a U-shaped double bar. In order for the wire pieces, that is to say the bars or double bars, to now be connected to at least one circuit board arrangement for the interconnection with the inverter circuit, in each case one bar end or multiple bar ends are produced or formed on at least one wire end of each wire piece. Here, the cross section of each bar end has, in the described manner, a second cross-sectional area which is smaller than the first cross-sectional area. The bar ends are thus narrowed in relation to the cross section of the original wire. Passage bores are produced on the at least one circuit board arrangement, where the passage bores have a diameter smaller than the maximum dimension of the first cross-sectional area. In other words, the unprocessed wire, with its first cross-sectional area, cannot be plugged through the passage bores. Instead, in each case one of the bar ends, with the second cross-sectional area, is plugged through in each case one of the passage bores. This yields the described connection between the bars and the at least one circuit board arrangement.

As already stated, it may be provided that multiple bar ends are formed per wire end, such that the wire end is forked. Here, each prong of the fork corresponds to one bar end. This results in that an electrically conductive cross section in the region of the passage bores can be defined by the number of bar ends.

In some implementations, the method provides that the bar ends are produced by a severing process, such as a punching process or milling. By the punching process, the bar ends may be implemented in the same production step as the severing of the wire. A severing process (punching, milling) provides that the excess cross-sectional area, that is to say the difference between the first cross-sectional area and the second cross-sectional area, is actually removed and is not upset by deformation at a different point of the bar.

In some implementations, the bar ends are narrowed from the first cross-sectional area to the second cross-sectional area by a deformation process. This may be performed by a pulling-apart process. In other words, for the severing of the wire into the wire pieces, the wire may be torn. This automatically narrows the cross section at the tear point. An alternative possibility is the rolling of the wire pieces in order to thereby produce the bar ends. The wire pieces may also, at their wire ends, be fanned out or split up into two or more bar ends by a longitudinal cut or multiple longitudinal cuts.

In some examples, a guide element, for example a metal body with a bulge formation, is arranged at one side of at least one passage bore. One of the wire ends is plugged through the passage bore from an opposite, other side of the passage bore and, during the plugging-through process, is pressed against the guide element. Here, the wire end is bent on the guide element. The described form fit is thus realized, in the case of which the wire end is curved or bent on the opposite side of the passage bore.

As already stated, it is also possible for at least one of the bar ends to be bent after the plugging-through process. Provision may additionally or alternatively be made for at least one of the bar ends to be upset to a third cross-sectional area which is larger than the second cross-sectional area in the passage bore. This yields the described riveting of the bar ends to the at least one circuit board arrangement.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
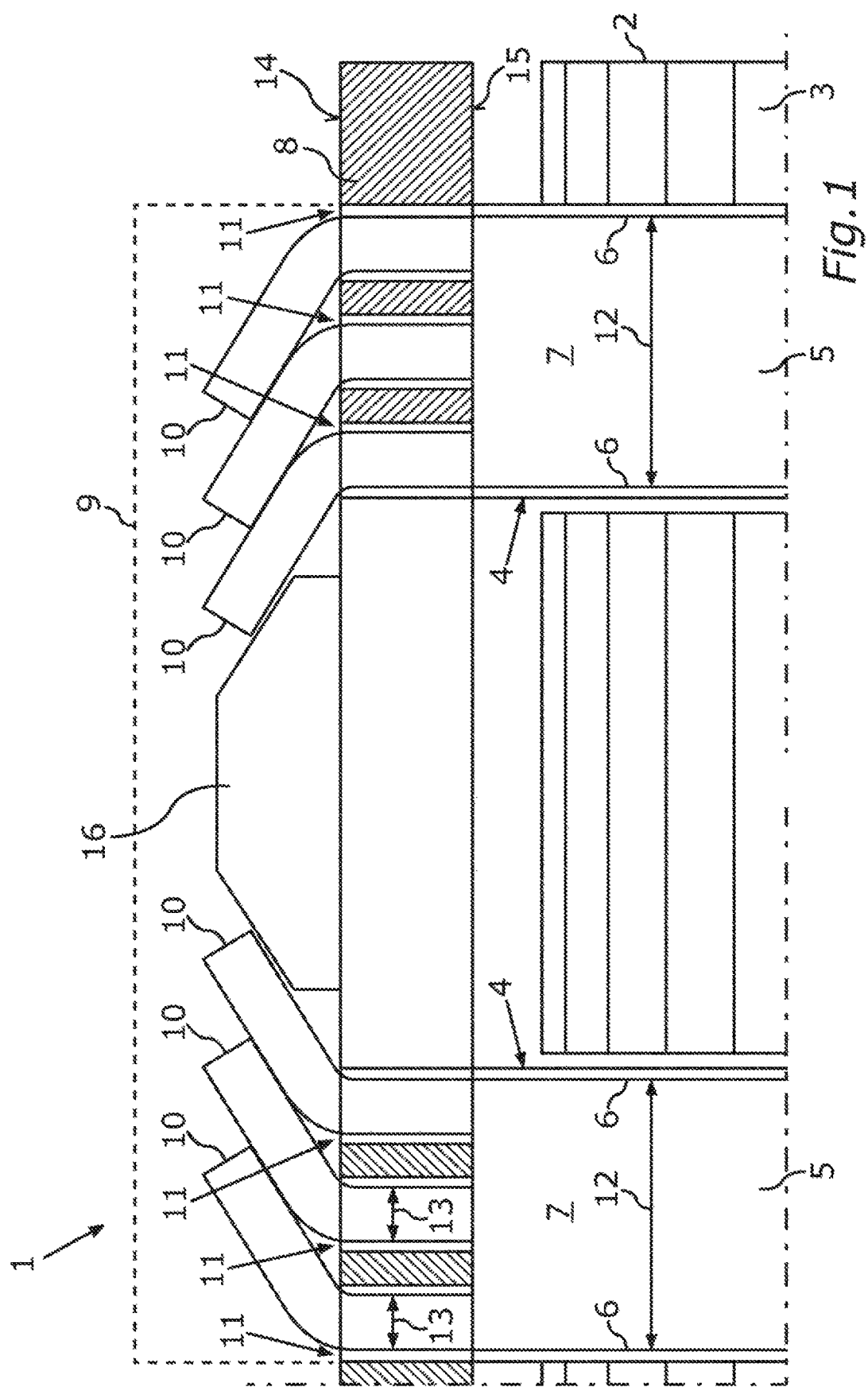
FIG. 1 shows a schematic illustration of an exemplary electric machine.

FIG. 1 shows an electric machine 1 which may be an electric starter or an electric starter-generator for a motor vehicle. The illustration shows the laminated core 3 of a stator 2. The lamination of the laminated core 3 is symbolically represented in FIG. 1 by horizontal lines. In grooves 4 of the stator 2, there are arranged in each case one or more electrically conductive conductor bars of the (short) bars 5, which together form an electrical winding of the stator 2 in a manner known per se. Each bar 5 may have an electrical insulator 6, by which an electrically conductive material 7 of the bar 5 is electrically insulated with respect to the laminated core 3. The bars 5 may for example be formed from copper, and the electrical insulator 6 may for example be formed from a polymer. The bars 5 are solid.

FIG. 1 furthermore illustrates a circuit board arrangement 8. The circuit board arrangement 8 may be for example a printed circuit board (PCB). Electronic components of an inverter circuit 9 may be arranged on the circuit board arrangement 8. The inverter circuit 9 may however also be arranged on another circuit board arrangement (not illustrated).

To interconnect the bars 5 with the inverter circuit 9, the bars 5 are directly connected to the circuit board arrangement 8. For this purpose, each bar 5 has a bar end 10 or multiple bar ends 10, each of which is plugged through in each case one passage bore 11 of the circuit board arrangement 9. Each bar end 10 is plugged individually into one other passage bore 11. The passage bores 11 may have been drilled using a drill. The passage openings 11 may have a circular hole cross section.

The passage bores 11 have a diameter that is smaller than a maximum dimension 12 of the respective bar 5 in the region of the grooves 4. By contrast, the bar ends 10 have a maximum dimension 13 that is smaller than or equal to the diameter of the respective passage bore 11. For the sake of clarity, only some diameters 13 are illustrated in FIG. 1.

To hold the bars 5 on the circuit board arrangement 8, the bar ends 10 are bent or curved on an opposite side 14 in relation to a stator-facing side 15 of the circuit board arrangement 8. To be able to conduct electrical current from the bars 5 to the circuit board arrangement 8, a bus rail 16 may be arranged on the circuit board arrangement. The arrangement illustrated in FIG. 1 may additionally be welded or soldered (not illustrated) to the opposite side 14 of the circuit board arrangement 8 in order to thereby provide a cohesive connection between the bar ends 10 and the bus rail 16.

Figure 2:
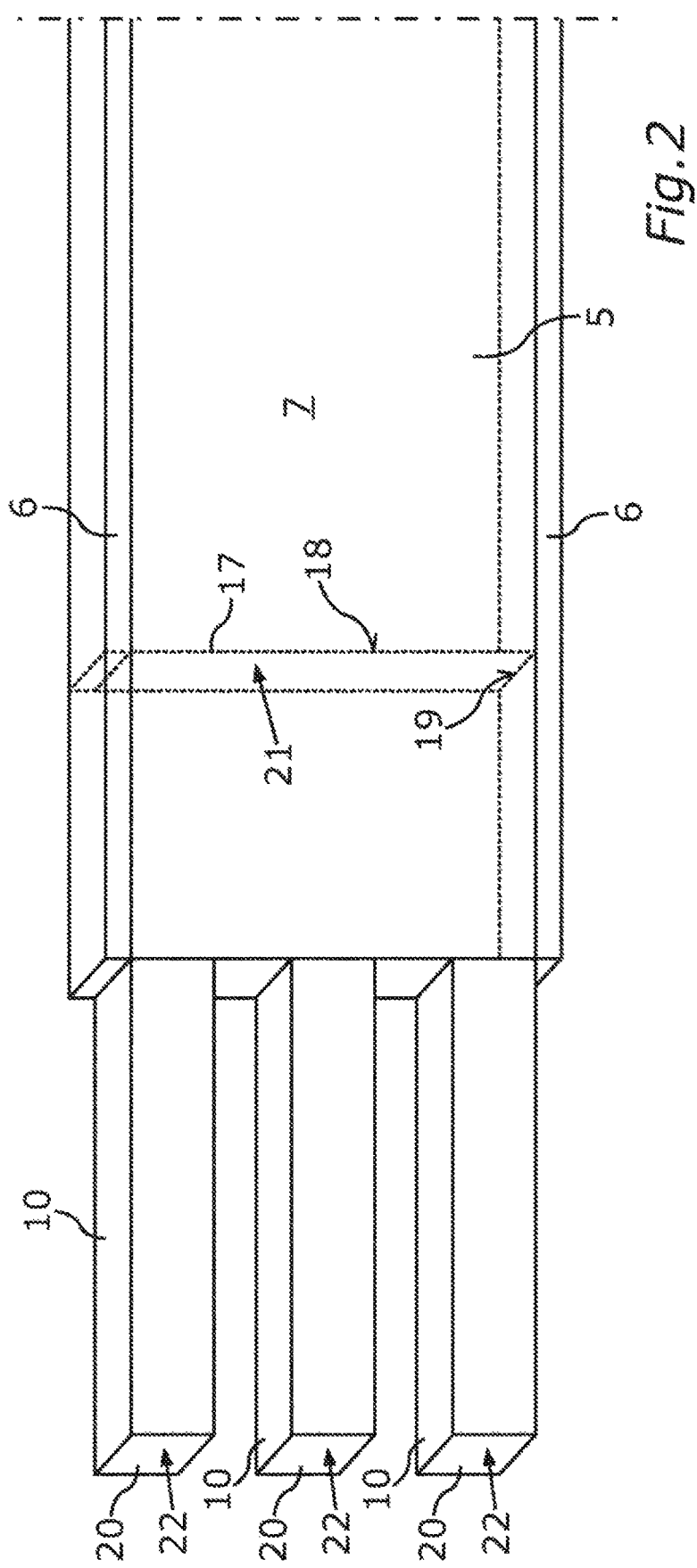
FIG. 2 shows a schematic illustration of a side view of a bar of an electrical winding of the electric machine from FIG. 1 with multiple forked bar ends.

FIG. 2 illustrates a single bar 5 with multiple bar ends 10 on the end of the bar 5. The bar 5 thus has a forked shape. The bar 5 has, in the region of the grooves 4, a cross section 17 which has a rectangular shape with a long side 18 and a short side 19. A dimension of the long side 18 may for example lie in a range from 2 millimeters to 15 millimeters. A dimension of the short side 19 may lie in a range from 0.5 millimeters to 10 millimeters. Here, the short side 19 is smaller than the long side 18. For example, the short side 19 is at most half as long as the long side 18. The maximum dimension 12 corresponds to the length of the diagonal of the rectangular shape.

By contrast, the bar ends 10 have a cross-sectional area 20 which has a square shape. Furthermore, a first cross-sectional area 21 of the cross section 17 of the bar 5 in the region of the grooves 4 is larger than any cross-sectional area 22 of the bar ends 10. The bar 5 may be formed from a tetragonal wire, where, to form the bar ends 10, the wire may have been split up into individual wire pieces by a punching tool, with the punching tool having simultaneously shaped the bar ends 10 during the severing process. The maximum dimension 13 corresponds to the length of the diagonal of the square shape.

Figure 3:
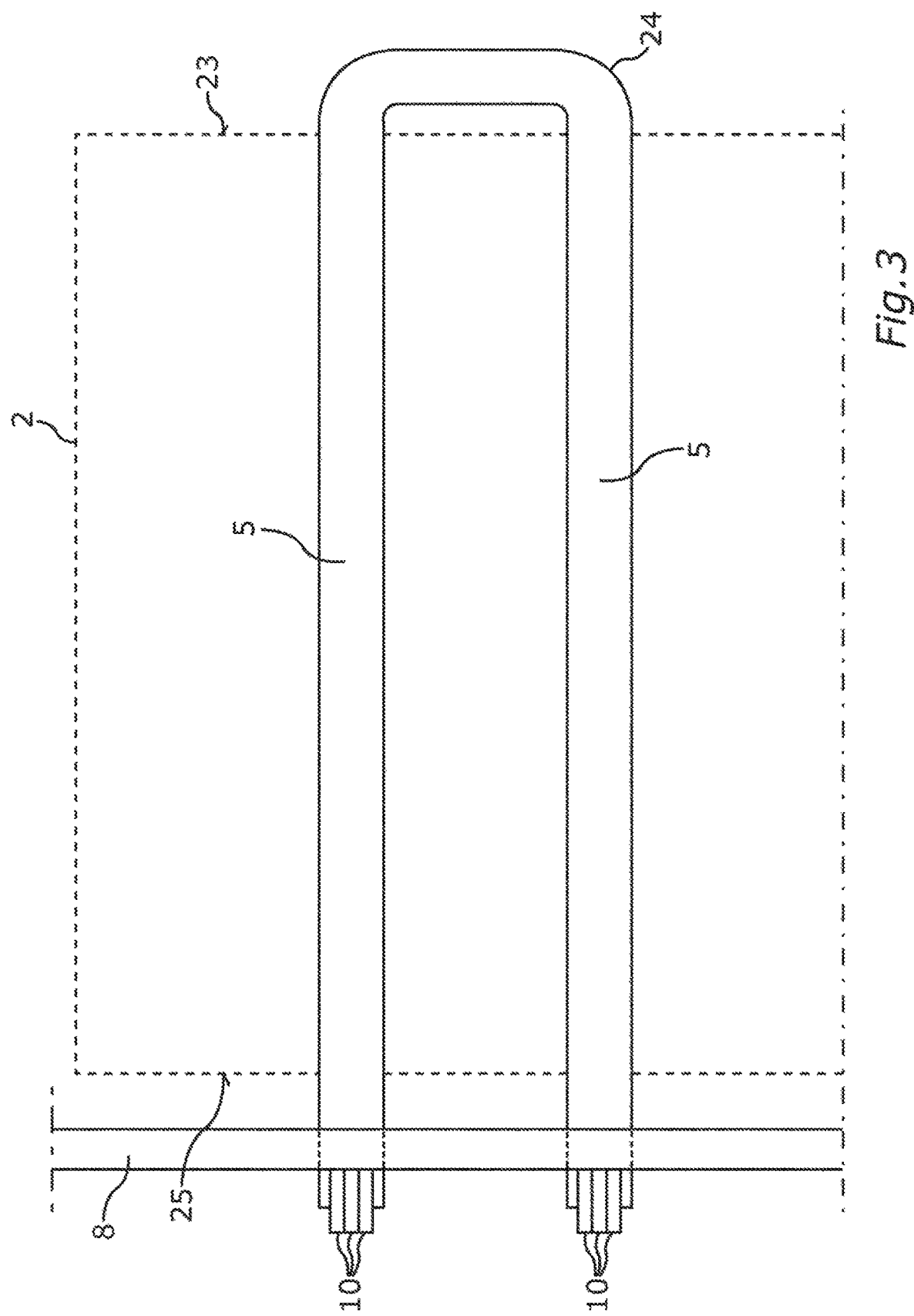
FIG. 3 shows a schematic illustration of a longitudinal section through the electric machine.

To form individual coils or loops of the electrical winding of the stator 2, individual bars 5 are electrically connected to one another in each case in pairwise fashion. In this regard, FIG. 3 shows how, at one axial end 23 of the stator 2, two bars 5 may be connected by the two bars 5 being formed by a U-shaped wire piece 24, such that, in this way, an electrical connection of the bars 5 is realized at the axial end 23. At the opposite axial end 25, the bars 5 may in each case be electrically connected to a further bar (not illustrated) by the circuit board arrangement 8. In some example, the bars 5 are directly interconnected with the inverter circuit 9.

Figure 4:
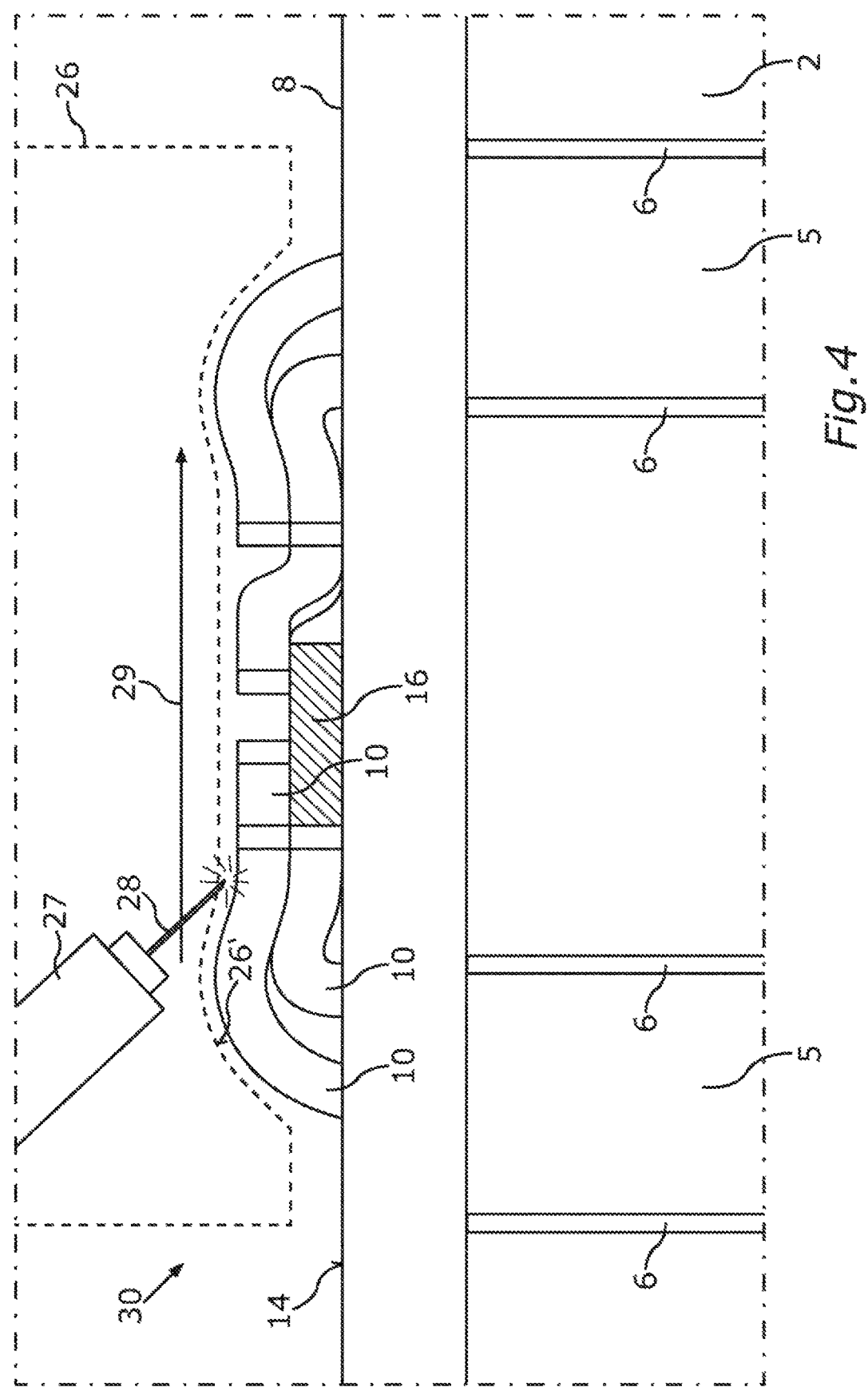
FIG. 4 shows a schematic illustration of a form fit of bar ends with a circuit board arrangement of the electric machine.

FIG. 4 illustrates the bending process such as may be provided for example for producing the connection as per FIG. 1. As the bar ends 10 are plugged through the passage openings 11 of the circuit board arrangement 8, a guide element 26, for example a metal body, may be arranged on the opposite side 14, against which guide element the bar ends 10 are pressed during the plugging-through process. By a curved surface 26' of the guide element 26, the bar ends 10 are bent in a desired direction. After removal of the guide element 26, by a laser 27, a laser beam 28 may be passed for example in a pivoting movement 29 over the bar ends 10 and the bus rail 16, and in this way the material of the bar ends 10 may be welded to the material of the bus rail 16.

The circuit board arrangement 8 with the interconnected bar ends 10 includes, overall, a winding head 30 of the winding of the electric machine 1. In some example, the winding head 30 is flat. It is furthermore the case that only conductor tracks on the circuit board arrangement 8 are needed for the interconnection of the bars 5 for the electrical winding, such that complex bending processes for bringing the bars 5 together are not necessary.

The circuit board arrangement 8 has one or more openings, which are smaller than the cross section of the bus rails or bars 5. By a reduction of the original cross section 17 at the bar ends 10 of each bar 5, the bar ends 10 already serve, after being plugged through the openings, as bearings for the circuit board arrangement 8. On the opposite side 14, the bars 5 are electrically and mechanically connected either to the circuit board arrangement 8 itself or to an additional bus rail 16. The two electrically conductive outer layers, for example copper layers, of the circuit board arrangement 8 are ideally electrically conductive in the region of the passage bores 11, and connect the bar ends 10 to one or more components on the circuit board arrangement 8 or also to one another. A further possibility is the angling of the bar ends 10 (see FIG. 1) that project out of the circuit board arrangement 8. This may be performed in the described manner (FIG. 4) during the plugging-through process or else following the latter. A form fit is thus generated. The reduction of the cross section 17 in the region of the bar ends 10 in relation to the bars 5 themselves is ideally configured such that the resultant shape to be plugged through includes at least a square or circular element. A milling-out process is thus omitted during the manufacture of the circuit board, because it is always the case that round, for example circular, bores are sufficient for enabling the bar ends 10 to be plugged through. The bars 5 of rectangular cross section 17 can thus, without rectangular milled-out portions in the circuit board arrangement 8, be plugged exclusively through circular bores in the circuit board arrangement 8 and connected to the latter. There is no need for an additional sleeve element or intermediate element with a force fit for the through-contacting. No further components are needed on the circuit board arrangement 8 for connecting a bar 5 to the circuit board arrangement 8.

The principle according to the disclosure can thus, in the case of the electric machine 1, be used wherever electrically conductive bars, for example bus rails, have to be connected to power electronics, or relatively complex interconnections of bars by the circuit board arrangement have to be provided.

Overall, the example shows how a forked connection of phase terminals of a stator winding to a circuit board arrangement can be provided by the disclosure.

A number of implementations have been described. Nevertheless, it will be understood that various modifications may be made without departing from the spirit and scope of the disclosure. Accordingly, other implementations are within the scope of the following claims.

What is claimed is:

1. An electric machine comprising:
    a stator having an electrical winding, the electrical winding includes electrically conductive bars arranged partially in grooves of the stator and each of which has a first cross-sectional area in a region of the grooves;
    an inverter circuit for a controlled electrical energization of the winding, the inverter circuit is electrically connected to the bars of the winding, and/or at least some of the bars are electrically connected in pairwise fashion to one another, by at least one circuit board arrangement;
    a bus rail arranged on the at least one circuit board arrangement; and
    an electrically conductive outer layer being part of the at least one circuit board arrangement;
    wherein a wire is severed into wire pieces to provide the bars;
    wherein the at least one circuit board arrangement has passage bores with a diameter smaller than a maximum dimension of the first cross-sectional area; and
    wherein at least one of the bars is of forked design and thus has multiple bar ends, each of which is plugged through one of the passage bores, and each of the bar ends is bent on the opposable side of the passage bore as viewed from the grooves such that each of the bar ends contacts the at least one circuit board arrangement, and at least two of the multiple bar ends are bent towards one another;
    wherein in each case each of the bar ends of one of the bars is plugged through each passage bore, wherein each of the plugged-through bar ends has, in the region of the passage bore, a second cross-sectional area which has a maximum dimension smaller than the diameter of the passage bore or equal to the diameter of the passage bore;
    wherein at least some of the bar ends are cohesively connected to an electrically conductive outer layer of the at least one circuit board arrangement and to the bus rail arranged on the at least one circuit board arrangement.

2. The electric machine of claim 1, wherein a cross section of each bar end is narrowed to the second cross-sectional area by a severing process or a deformation process.

3. The electric machine of claim 1, wherein the bars have, in the grooves, a rectangular cross section with a long side and a short side, and the bar ends have, in the region of the passage bore, a square cross section or circular cross section.

4. The electric machine of claim 1, wherein the electrical winding has multiple coils, and some or all of the coils are electrically interconnected with one another by the at least one circuit board arrangement.

5. The electric machine of claim 1, wherein at least some of the bar ends have a third cross-sectional area, which is larger than the second cross-sectional area, on the opposite side of the passage bore as viewed from the grooves.

* * * * *